United States Patent [19]
Manly

[11] 3,865,615
[45] Feb. 11, 1975

[54] NON-THROMBOGENIC PLASTICS

[75] Inventor: Donald G. Manly, Allentown, Pa.

[73] Assignee: Air Product and Chemicals Inc., Wayne, Pa.

[22] Filed: May 7, 1973

[21] Appl. No.: 357,634

[52] U.S. Cl.............. 117/47 A, 3/1, 117/62.1, 117/118, 117/138.8 E, 117/138.8 F, 424/94
[51] Int. Cl..... B44d 1/092, B44d 1/44, B32b 27/06
[58] Field of Search......... 3/1; 424/94; 117/138.8 E, 117/47 A, 118, 138.8 F, 62.1

[56] References Cited
UNITED STATES PATENTS

| | | | |
|---|---|---|---|
| 2,811,468 | 10/1957 | Joffre | 260/94.9 |
| 3,617,344 | 11/1971 | Leninger | 117/118 |
| 3,634,123 | 1/1972 | Eriksson | 3/1 |
| 3,639,213 | 2/1972 | Ginger | 424/94 |
| 3,691,016 | 9/1972 | Patel | 424/94 |
| 3,826,678 | 7/1974 | Hoffmann | 117/118 |

OTHER PUBLICATIONS

Hoffman et al., "Covalent Binding of Biomolecules," in Trans. Amer. Soc. Artif. Intern. Organs, Vol. 18, pp. 10–18, 1972.
Kusserow "The Urokinase–Heparin Bonded Synthetic Surface," in Trans. Amer. Soc. Artif. Organs, Vol. 17, pp. 1–5, 1971.

*Primary Examiner*—William D. Martin
*Assistant Examiner*—William H. Schmidt
*Attorney, Agent, or Firm*—Harold A. Horman; Barry Moyerman

[57] ABSTRACT

Non-thrombogenic plastic materials are prepared by a process which first fluorinates polyolefins or polyesters under conditions which produce both fluoride groups and reactive carboxyl groups and then reacts the carboxyl group on the substrate with plasminokinase enzymes which activate plasminogene to plasmin. Such treated plastic materials can be used in devices, coming in direct contact with blood without accelerating clotting, as in membranes for blood dialysis and in other extracorporeal biomedical devices as well as in devices and conduits intended for prosthesis or body implants.

15 Claims, No Drawings

NON-THROMBOGENIC PLASTICS

BACKGROUND OF THE INVENTION

It has heretofore been recognized that plastic materials display a tendency to initiate blood clotting. To overcome this propensity it has been previously proposed to render the surfaces of plastic polymers non-thrombogenic by incorporation of heparin in the surface of polymeric plastics intended for contact with mammalian blood. Thus, in U.S. Pat. No. 3,639,141 certain fluorocarbon plastic materials are described which after being swelled by treatment with an organic solution of an amino alkyl trialkoxy silane compound, are contacted with water and heparin for the stated purpose of hydrolyzing the alkoxy groups and effecting bonding of the heparin to the resulting amino-silane treated surface. In U.S. Pat. No. 3,673,612 certain non-thrombogenic polymeric plastics are describd which are made by bonding a heparin type anticoagulant to the plastic surface through an acetal or hemiacetal bridge formed therein. In U.S. Pat. No. 3,617,344 heparinization of plastic polymer surfaces is effected by pretreatment with quaternary ammonium groups previously incorporated in the surface of the polymer.

Other approaches at producing non-thrombogenic plastic surfaces are described in the literature; see for example, Leininger et al.: "Nonthrombogenic Plastic Surfaces," *Science* 152: 1625–1626 (1966); Salzman et al.: "A New Antithrombotic Surface," *Surgery* 61: 1–10 (1967); Merrill et al.: "Antithrombogenic Cellulose Membranes for Blood Dialysis," *Trans. Am. Soc. Artificial Internal Organs*, 12: 139–150 (1966).

While heparinization can produce improved non-clotting surfaces, the effect is considered of limited duration [see Merrill et al.: *Journ. Applied Physiology*, 29: 723–(1970); and McHattie: "Plastics in Medicine and Surgery" Symposium, Univ. of Newcastle-upon-Tyne Med. School, Sept. 1971] because these depend upon desorption of the heparin from the plastic in contact with blood.

Among the objects of the present invention are to provide a durable non-thrombogenic plastic presenting a surface which does not depend for anti-clotting properties on leaching of heparin or similar anti-clotting agents from the plastic, and one capable of retaining its desirable physical properties in the employed environment over extended periods of time.

SUMMARY OF THE INVENTION

The advantageous thrombogenic plastics are produced in accordance with the present invention, by chemically bonding to the plastic surface an enzyme material having the property of activating plasminogen conversion to plasmin. The plasmin thus produced is a proteolytic enzyme which causes lysis of blood clots producing fibrin derivatives. The starting plastic is preferably a polyolefin or polyester which has been surface-modified by fluorination under conditions effecting formation or retention of reactive carboxyl moieties therein in addition to fluoride groups.

DETAILED DESCRIPTION OF THE INVENTION AND PREFERRED EMBODIMENTS

For use externally or internally in contact with body fluids a plastic material at the outset must be highly inert and free of reactive chemical groups subject to hydrolysis or oxidation, in an environment affording active substances causing or triggering untoward hydrolytic or enzymatic reactions. This is particularly true in connection with materials intended for use in contact with mammalian blood because of the known general tendency of plastics to initiate clotting of such blood.

The plastic starting material selected for use in the practice of the present invention is a polyolefin or polyester, the surface of which has been reacted with fluorine, under conditions forming reactive carboxyl groups therein or thereon on the one hand, while simultaneously further placating the surface by the formation of highly inert $CF_2$ groups. In the fluorination of polyesters in addition to carboxyl some hydroxyl may be formed. These reactive carboxyl groups formed in or on the surface of the plastic are capable of binding certain enzymes by chemical reaction, typically by formation of amido groups with the $NH_2$ of the enzymes. A number of chemical methods are known for bonding enzymes to substrates, and which can be employed in the practice of the present invention.

The term "plasminokinase" has been applied to define that group of enzymes having the property of activating conversion of plasminogen to plasmin, and includes in the term urokinase and streptokinase. These enzymes are described in Boyer: "The Enzymes," published by *Academic Press* and the mechanism of their action in effecting fibrinolysis or liquefaction of blood clots therein explained. Streptokinase is a commercially available product and urokinase is available in research quantities. Production of urokinase from mammalin urine is described in U.S. Pat. Nos. 2,961,382; 2,983,647 and 2,989,440. The bonding of these plasminokinases to substrates can be effected through primary amino groups present in these enzymatic products.

The starting polyolefin plastic employed in practice of the invention may be polyethylene, polypropylene or ethylene propylene copolymers. Such polyolefin is oxy-fluorinated by exposure to a gaseous mixture containing fluorine and a controlled amount of oxygen. The known fluorination of polyolefins in the absence of oxygen does not provide the desired properties utilized in the present invention, particularly from the standpoint of furnishing the necessary reactive carboxyl groups for subsequent bonding to the enzyme material. The oxy-fluorinating gas should contain oxygen in a ratio by volume to fluorine of 0.5/1 to 20/1, and may be contained in a carrier gas providing an inert diluent. Preferably, the fluorinating gas mixture should contain no less than about 0.25 percent fluorine by volume.

Among the polyester starting materials proposed for use in practice of the present invention are those having the repeating structure $-[CO(R)COO(R_1)O]-$ wherein $R$ and $R_1$ are hydrocarbon groups independently selected from linear hydrocarbons having 1 to 18 carbon atoms and the cyclic hydrocarbons $C_6H_{10}$ and $C_6H_4$. Such polyesters are prepared in conventional manner by reacting a dibasic carboxylic acid with an alcohol.

Examples of various types of polyester materials having the above designated repeating structure which can be used as starting materials for practice of the present invention are those having such repeating structures as:

—[CO(C₆H₄)COO(CH₂CH₂)O]—
—[CO(C₆H₁₀)COOCH₂O]—
—[CO(C₆H₄)COO(CH₂)₁₈O]—
—[CO(C₆H₁₀)-COO(C₆H₄)O]—
—[CO(C₆H₄)COO(CH₂)₁₂O]—
—[CO(CH₂)₄COO(C₆H₁₀)O]—

The fluorination-carboxylation can be carried out by batch treatment or on a continuous basis by passing the polyolefin or polyester in the form of a film, fiber, fabric or the like through a fluorine-oxygen mixture maintained in a suitable sealed chamber provided with gas tight seals through which the polymeric material enters and leaves. Alternatively, the polymeric material can be unrolled and rerolled in the treating chamber.

The polyester compounds will provide carboxyl binding sites even when fluorinated in the absence of oxygen. The fluorinating gas mixture for polyesters should contain at least about 1 percent fluorine and may contain 0 to 6 percent of oxygen, the balance, if any, being made up of inert gaseous diluent. The fluorination of polyester compounds for improved soil release, dye receptivity, and wettability is described and claimed in copending application Ser. No. 285,831 filed Sept. 1, 1972 and no claim to such fluorination per se is made in the present application.

Among the more readily available and preferred polyester starting materials for use in the present invention are the polyethylene terephthalates such as those marketed under the trade designations Dacron and Mylar.

Fluorination time, temperature and concentration are interrelated and may be varied over fairly wide ranges to accomplish the stated extent of chemical modification of the plastic surface. Thus temperatures in the range of 0° to 50°C for exposure times of 30 sec. to 3 hours can be employed with gas mixtures containing 1 to 40 fluorine, while with gas mixtures of higher fluorine concentration, as between 40 to 100 percent by volume of gas, lower temperatures and/or shorter exposure time may be used. The desired modification of the plastic is obtained by incorporation of as little as 0.0004 percent fluorine therein, with the preferred range being from about 0.25 to 0.4 percent and up to about 1 perent; higher fluorine content does not appear to be of added advantage.

Numerous methods have been described in the literature for bonding enzymes to substrates. Certain of these methods are discussed in Stark: "Biochemical Aspects of Reactions in Solid Support," *Academic Press* 1971, pages 1–72. Among the more common of the known methods is that via the carbodiimide reaction, wherein a carboxyl-containing substrate is reacted with a carbodiimide compound in the presence of acid and the obtained imido ester addition compound reacted with the enzyme having a primary amino group, to form an amido linkage between the enzyme and the substrate and release of a urea derivative corresponding to the original carbodiimide, thus:

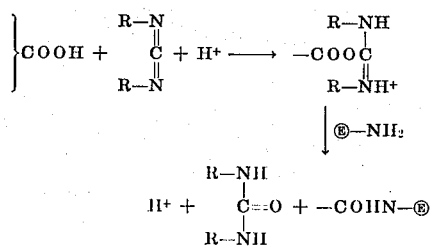

The method of coupling of an enzyme containing an active amine group to an acid polymer through its carboxyl group, is described in U.S. Pat. No. 3,691,016. As therein described, the carboxyl moiety is esterified and the ester then condensed with the amine moiety. Among the compounds therein suggested for esterification of the carboxyl moiety are: 3-unsubstituted isooxazolium salts, carbodiimides, carbo-diimidazoles alone or in admixture with nitrophenols or halophenols. The methods disclosed in the aforesaid patent are applicable for coupling of the carboxy moieties contained in fluorinated polyolefin or fluorinated polyester plastics to urokinase or streptokinase or mixtures of these, in accordance with the invention.

The examples below illustrate the preparation of non-thrombogenic plastics in accordance with the invention, but are not to be considered as limiting the scope thereof.

EXAMPLE 1 a. A film of 4 mil low density polyethylene was placed in a sealed, air tight chamber and the chamber evacuated to remove any air present. The chamber was equipped with appropriate inlet and outlet openings to provide a flow system through the chamber. A gaseous mixture composed of 30 percent fluorine, 30 percent oxygen and 40 percent nitrogen (each by volume) was passed through the chamber at ambient temperature for thirty-three minutes and the chamber subsequently evacuated to remove unreacted gas.

b. To effect chemical bonding of plasminogen activator thereto, a film prepared as described in (a) above, is suspended in distilled water and 0.1 N sodium hydroxide added until no further decrease in pH occurs on standing. The film is then thoroughly washed in distilled water and again suspended in distilled water at 4°C. To the water containing the suspended film there is then added a 2 percent aqueous solution of N-ethyl-5-phenylisooxazolium-3-sulfonate in an amount corresponding to 20 cc solution per gram of polymer film. Contact of the film with the solution was maintained, with continual mild shaking, for ten minutes, following which there was added thereto an aqueous solution of urokinase providing 1/4 parts urokinase to the original fluorinated film weight. Mild shaking was continued for about 36 hours, the solution withdrawn, and the treated film thoroughly washed in water and dried.

The film contains urokinase chemically bound in insoluble form in its surface layer.

EXAMPLE 2

Similar bonding is effected by substituting streptokinase for the enzymatic material employed in the previous example.

A film prepared as described in Example 1a above, is suspended in distilled water as described in Example 1(b). An aqueous solution of streptokinase is added to the water followed by addition of hexamethylene diamine. Contact is continued with slight agitation over a period of about 30 hours, after which excess reactants are removed by washing in distilled water.

EXAMPLE 3 a. Polyethylene tubing was treated with a flowing gas mixture of 95 percent oxygen and 5 percent fluorine for 30 minutes, followed by a nitrogen purge.

b. The fluorinated tubing was thoroughly washed in distilled water until the wash water showed pH 7. The washed tubing was then filled with a dilute solution of urokinase and such solution circulated through the tubing for six hours. Hexamethylene diamine was then added and circulation continued over night. The urokinase which is bonded to the oxyfluorinated polyethylene is fixed by further reaction with the added hexamethylene diamine. The tubing after washing and drying exhibits active non-thrombogenic properties, as demonstrated by an in vitro whole blood clotting time in excess of 60 minutes.

EXAMPLE 4 a. Following the procedure outlined in Example 1(a), 1 mil polyester film (Mylar) was exposed for five minutes to a dry gaseous mixture composed of 30 percent fluorine and 70 nitrogen.

b. A sample of the fluorinated polyester film prepared as described in (a) above, after being washed and dried, is suspended in 7.5 M urea solution with mild shaking. A solution is then prepared from 0.2 M 1-cyclohexyl-3-(morpholinoethyl) carbodiimide, and 1.0 M urokinase in 7.5 M urea solution, and the obtained mixture is added to the urea solution containing the suspended film. Contact is continued for 3 hours with shaking while maintaining pH at 4.75.

The non-thrombogenic materials obtained in accordance with the invention can be employed in extraneous storing and handling of whole blood, in membrane assemblies for blood dialysis, as well as in various kinds of prosthesis and corporeal implants.

In general it is preferred to employ an amount of enzyme in slight stochiometric excess in order to obtain maximum incorporation in the polymeric plastic and minimum residual free carboxyl groups. The treatment with an amino compound, as in Examples 2 and 3, will effect reaction with any residual carboxy groups in the plastic as well as the further bonding of any free carboxyl groups contained in the enzyme.

What is claimed is:

1. Non-thrombogenic plastic comprising a fluorinated polymeric plastic from the group consisting of polyolefins and polyesters having chemically bound directly thereto through amido linkages a plasminokinase.

2. A product as defined in claim 1 wherein said polyolefin is a polyethylene.

3. The product as defined in claim 2 wherein said plasminokinase is urokinase.

4. The product as defined in claim 2 wherein said plasminokinase is streptokinase.

5. A product as defined in claim 1 wherein said polyester is a polyethylene terephthalate.

6. The product as defined in claim 5 wherein said plasminokinase is urokinase.

7. The product as defined in claim 5 wherein said plasminokinase is streptokinase.

8. The product as defined in claim 1 wherein said plasminokinase is urokinase.

9. The product as defined in claim 1 wherein said plasminokinase is streptokinase.

10. The method of imparting antithrombogenic properties to the surface of a plastic material from the group consisting of polyolefins and polyesters which comprises fluorinating such plastic material under conditions to form associated carboxylic moieties therein and chemically binding thereto through such carboxylic moieties a plasminogen activator selected from the group consisting of urokinase and streptokinase.

11. The method as defined in claim 10 wherein the fluorinated plastic containing carboxylic moieties is esterified by reaction with a carbodiimide compound prior to reaction with said plasminogen activator.

12. The method as defined in claim 10 wherein said conditions to form associated carboxylic moieties includes the step of subjecting the fluorinated plastic material to contact with water.

13. The method as defined in claim 11 wherein said polyolefin is polyethylene.

14. The method which comprises subjecting polyethylene to a gaseous mixture containing oxygen and fluorine, said oxygen being present in a volume ratio of 0.5/1 to 20/1 to fluorine in said gaseous mixture; further reacting the obtained oxyfluorinated polyethylene with an aqueous solution of urokinase followed by fixing the thus bonded urokinase by further reaction with hexamethylene diamine.

15. The method according to claim 14 wherein said gaseous mixture comprises about 95 percent oxygen and 5 percent fluorine.

* * * * *